US008382936B2

(12) United States Patent
Alevisopoulos et al.

(10) Patent No.: US 8,382,936 B2
(45) Date of Patent: Feb. 26, 2013

(54) AQUEOUS BIOPOLYMER-CONTAINING LABELING ADHESIVE

(75) Inventors: Stefan Alevisopoulos, Berkshire (GB); Edward W. Day, Middlesex (GB)

(73) Assignee: Henkel AG & Co. KGaA, Duesseldorf (DE)

( * ) Notice: Subject to any disclaimer, the term of this patent is extended or adjusted under 35 U.S.C. 154(b) by 1083 days.

(21) Appl. No.: 11/404,916

(22) Filed: Apr. 14, 2006

(65) Prior Publication Data
US 2007/0240823 A1 Oct. 18, 2007

(51) Int. Cl.
| C04B 37/00 | (2006.01) |
| A47G 19/22 | (2006.01) |
| B28B 11/00 | (2006.01) |
| B28B 21/00 | (2006.01) |
| B28B 21/72 | (2006.01) |
| B28B 23/08 | (2006.01) |
| B29D 22/00 | (2006.01) |
| B29D 23/00 | (2006.01) |
| B32B 1/08 | (2006.01) |
| F16L 9/10 | (2006.01) |
| C08B 31/12 | (2006.01) |
| A61K 9/28 | (2006.01) |
| D21H 19/58 | (2006.01) |

(52) U.S. Cl. ........... 156/325; 428/34.4; 524/50; 524/51; 524/52

(58) Field of Classification Search .................. 428/34.4; 524/50, 51, 52; 156/325
See application file for complete search history.

(56) References Cited

U.S. PATENT DOCUMENTS

| 3,939,108 A | | 2/1976 | Sirota et al. | |
| 3,988,495 A | * | 10/1976 | Lowey et al. | .................. 428/343 |
| 4,061,611 A | | 12/1977 | Glowaky et al. | |
| 4,352,692 A | | 10/1982 | Krinski et al. | |
| 4,440,884 A | | 4/1984 | Jannusch | |
| 4,462,838 A | | 7/1984 | Andres et al. | |
| 4,675,351 A | | 6/1987 | Brown | |
| 4,804,414 A | | 2/1989 | Gleason | |
| 4,964,939 A | | 10/1990 | Gleason | |
| 5,683,772 A | * | 11/1997 | Andersen et al. | ............ 428/36.4 |
| 6,440,204 B1 | | 8/2002 | Rogols et al. | |
| 6,590,019 B2 | | 7/2003 | Dheret et al. | |
| 6,596,860 B1 | * | 7/2003 | Kesselmans et al. | ......... 536/106 |
| 6,656,984 B1 | | 12/2003 | Haasmaa et al. | |
| 6,800,675 B1 | * | 10/2004 | Pfalz et al. | ....................... 524/47 |
| 2002/0151628 A1 | | 10/2002 | Dheret et al. | |
| 2003/0034129 A1 | | 2/2003 | Rogols et al. | |
| 2003/0064178 A1 | | 4/2003 | Smith et al. | |
| 2004/0241382 A1 | | 12/2004 | Bloembergen et al. | |
| 2006/0057370 A1 | | 3/2006 | Pasquier et al. | |
| 2006/0113028 A1 | * | 6/2006 | Gombert | ....................... 156/210 |

FOREIGN PATENT DOCUMENTS

| EP | 1254939 A1 | | 11/2002 |
| WO | WO2004044082 | * | 5/2004 |
| WO | WO 2004/108853 A1 | | 12/2004 |

* cited by examiner

Primary Examiner — Michael Orlando
(74) Attorney, Agent, or Firm — Sun Hee Lehmann

(57) ABSTRACT

Adhesives particularly useful for industrial bottle labeling are provided. The adhesives comprise at least one starch component and at least one protein component (which is not gelatin or casein). The adhesive is also free of synthetic polymer. The label, along with the adhesive, can be easily removed from the bottle during the recycling process. In one embodiment, the starch component does not contain leguminous starch having an amylose content of 25% or more. In another embodiment, the adhesive comprises a crosslinking agent.

11 Claims, No Drawings

AQUEOUS BIOPOLYMER-CONTAINING LABELING ADHESIVE

FIELD OF THE INVENTION

The invention relates to the field of adhesives. More specifically the invention relates to adhesives that are particularly well suited for use in bottle labeling applications.

BACKGROUND OF THE INVENTION

Both natural polymers and synthetic polymers have been used as base polymers in bottle labeling adhesive applications.

Natural polymer-based adhesives comprising, for example starch and/or casein, can be formulated to offer such advantages as good machinability, high wet strength, and ice water resistance. Synthetic emulsion polymer-based adhesives provide advantages such as, for example, a fast set time. Hot melt adhesives based on styrenic block copolymers are able to produce especially soft, often pressure sensitive adhesives, which are particularly effective in bonding plastic labeling films to plastic bottles.

While prior art adhesives provide numerous advantages, problems still exist in terms of processing, i.e., gluing the label to the bottle, the appearance of the finished label, and/or in the ease of removability of the label during recycling operations. A need therefore continues to exist in the art for adhesive formulations that are useful in bottle labeling applications, gives a good finished appearance and is removable with the label during conventional recycling operations. The current invention addresses this need.

SUMMARY OF THE INVENTION

Current bottle labeling formulations are normally based on either casein or synthetic (acrylic) polymer technology in combination with starch. The invention provides the art with a water based adhesive suitable for industrial bottle labeling applications and which is 100% free of casein, gelatin and synthetic polymer. The invention provides adhesives comprising biopolymers that are particularly well suited for use in bottle labeling. In contrast to labeling adhesive currently used in the art, the adhesive formulations of the invention exhibit a combination of good biodegradability and suitability for food packaging applications (e.g., compared to synthetic polymer based adhesives) with lower rates of glue consumption (compared to casein based adhesives), as good adhesion properties can be achieved with lower coat weights.

The invention is directed to a water-based adhesive formulation that is particularly advantageous for use in bottle labeling applications. The adhesive comprises a starch component and a protein component and is 100% free of casein, gelatin and synthetic polymer, i.e., the protein component may not comprise either casein or gelatin.

One embodiment of the invention the adhesive comprises, in addition to water, at least one starch (native or modified) and at least one protein (native or modified), but does not contain a leguminous starch having an amylose content of 25% to about 60%, casein or gelatin. The adhesive is also free of synthetic polymers.

In another embodiment of the invention the adhesive comprises, in addition to water, at least one starch (native or modified) and at least one protein (native or modified), and at least one crosslinking agent, and is free of casein, gelatine and synthetic polymers. The adhesive will preferably also comprise dicyandiamide and/or urea.

In particularly preferred embodiments the majority of the starch component comprises a modified starch, most preferably a carboxymethylated and/or hydroxypropylated starch. Most preferable the modified starch has a mean degree of substitution of less than 1.0, more typically less than 0.5. Surprisingly, when using the adhesive of the invention, good labeling properties can be achieved at significantly lower coat weights compared to traditional technologies heretofore known and practiced in the art.

Another embodiment of the invention is directed to a method for bonding a first substrate to a second substrate comprising applying to a surface of at least one of said first and/or second substrate the adhesive composition of the invention. Preferably, the first substrate is a label and said second substrate is a container. Particularly preferred for use in the method of the invention are glass containers, such as jars, bottles and the like.

Still another embodiment of the invention is directed to an article comprising a label, wherein the label is attached to the article by the adhesive described herein. In one embodiment, the article of the invention is a glass article comprising a label made of a cellulosic material, such as, for example, a paper label.

DETAILED DESCRIPTION OF THE INVENTION

The invention provides an adhesive, a method for bonding a first substrate to a second substrate, and articles manufactured using the adhesive of the invention, in particular labeled bottles and jars.

The invention provides the labeling industry with new kinds of labeling adhesives useful for applying labels onto containers, in particular glass containers. The adhesive has strong tack to hold the label on the glass substrate and satisfactorily secures label to glass within a short time. Moreover, the adhesive of the invention may be applied using conventional high-speed labelers such as pallet transfer rotary labelers of the type manufactured by Krones, A G. It has also been surprisingly found that whereas adhesives comprising casein typically need a coat weight of 16-22 $g/m^2$ (grams of adhesive per square meter of label substrate), good bonding can be achieved at coat weights of 8-12 $g/m^2$ when using the adhesive of the invention. The formulations of the invention can therefore be used to achieve good adhesion characteristics with lower coat weights than conventional casein based labeling adhesives, which results in a reduced consumption of the adhesive.

One embodiment of the invention the adhesive comprises, in addition to water, at least one starch (native or modified) and at least one protein (native or modified), but does not contain a leguminous starch having an amylose content of 25% to about 60%, casein or gelatin. The adhesive is also free of synthetic polymers.

In another embodiment of the invention the adhesive comprises, in addition to water, at least one starch (native or modified) and at least one protein (native or modified), and at least one crosslinking agent, and is free of casein, gelatine and synthetic polymers. The adhesive will preferably also comprise dicyandiamide and/or urea.

An "adhesive labeling composition" is defined as any composition intended for making it possible to glue, at least temporarily, a label of any kind (e.g., paper, cellulosic, plastic) on an article or container of any kind (glass, plastic, wood, corrugated board and the like).

An "adhesive suitable for industrial bottle labeling applications" means an adhesive with (i) good machining properties on industrial bottle and glass container labeling machines at slow and fast machine speeds (e.g., 10,000 to 75,000 bottles per hour), (ii) a sufficiently high level of wet tack (between 9-45 mm/kp when measured on a Fipago tack tester), (iii) in the case of paper labels, a sufficiently high level of Condensation Water Resistance (a minimum of 80% fibre tear of paper labels after freshly labeled bottles have been stored for 1 h under 25° C./95% RH and then left to dry at ambient conditions for 24 h), (iv) full removability of the label and the adhesive when washed in industrial bottle washers for returnable bottles, i.e. fully washable at minimum 70° C. and minimum 1.0% NaOH solution within less than 3 min), and (v) a viscosity within the range of 30000 mPa·s-200000 mPa·s in combination with good rheological properties that will allow the adhesive to be mechanically pumped and flow or pour under the influence of its own weight.

"Wet tack" refers to the stickiness of the adhesive in its wet state. This property gives the adhesive the ability to hold the label just applied to a bottle in place without sliding as it goes through high speed labeling equipment.

"Coat weight" as used herein means the weight per unit area of wet adhesive coating deposited on a substrate.

A "synthetic polymer" is defined as a polymer that does not occur in nature. Examples of synthetic polymers include polyvinyl alcohol, polyacrylic acid, polyvinylpyrrolindone, alkyl acrylates and the like. This term does not include naturally occurring proteins that are synthetically produced or natural proteins (whether isolated from nature or synthetically produced) that are modified by, e.g., hydrolysis or the like.

"Leguminous" is defined herein to mean any plant belonging to the families of the Cesalpinaceae, Mimosaceae or the Papilionaceae and especially any plant belonging to the family of the Papilionaceae such as, for example, peas, beans, broad beans, faba beans (*Vicia faba* minor), lentils, alfalfa, clover or lupins, and includes all the plants described in any of the tables contained in the article by R. HOOVER et al. entitled "Composition, structure, functionality and chemical modification of legume starches: A review," CAN. J. PHYSIOL. PHARMACOL., Vol. 69, 1991, pp. 79-92. A "non-leguminous starch" is a starch that is not obtained from a leguminous plant.

The invention provides a labeled container, such as a bottle or jar, wherein the label is attached to the container using a water-based adhesive which is 100% free of casein, gelatin and synthetic polymer, and comprises a starch component and a protein component. The label can be easily removed from the container during the recycling process by application of alkaline water. In certain embodiments, the label can be quickly and easily removed from the container during the recycling process using a hot water wash rather than caustic.

It has also been discovered that adhesives having improved biodegradability compared to other non-casein (e.g., synthetic polymer-based) adhesives can be formulated. It is generally recognized in the art that the lower the Chemical Oxygen Demand (COD) to Biochemical Oxygen Demand ($BOD_5$) ratio, the more biodegradable the adhesive. Adhesives having a COD/$BOD_5$ ratio of less than 10, more preferably less than about 5, even more preferably less that about 3, can be formulated in accordance with the invention. Methods of determining COD and $BOD_5$ are described in the Examples.

The adhesives of the invention will comprise at least one starch. Starches that can be used in the practice of the invention include maize or corn, waxy maize, potato, cassava, tapioca and wheat starch. Other starches include varieties of rice, waxy rice, pea, sago, oat, barley, rye, amaranth, sweet potato, and hybrid starches available from conventional plant breeding, e.g., hybrid high amylose starches having amylose content of 40% or more, such as high amylose corn starch. Also useful are genetically engineered starches such as high amylose potato and waxy potato starches. Preferred starches are low amylose starches. As used herein, the term "low amylose" is intended to include starches containing less than 40% by weight amylose. Also preferred are waxy starches. As used herein, the term "waxy" is intended to include a starch containing at least about 95% by weight amylopectin. In a particularly preferred embodiment, the adhesive comprises a potato starch that has an amylose content of less than 25%.

Preferred for use are starches that have been chemically modified or derivatized, such as by etherification, esterification, acid hydrolysis, dextrinization, crosslinking, cationization, heat-treated or enzyme treatment (e.g., with alpha-amylase, isoamylase, or glucoamylase). Suitable starches include, without limitation, hydroxyalkylated starches such as hydroxypropylated or hydroxyethylated starches, carboxyalkylated starches such as carboxymethylated starches, and succinated starches such as octenylsuccinated or dodecylsuccinated starches. The starches may also be physically modified, e.g., extrusion, spray-dry, drum-dry, agglomeration, pregelatinization.

Starches will typically have a weight average molecular weight of at least 10,000 Daltons, more preferably at least about 100,000 Daltons, more typically above about 500,000 Daltons, and even more typically greater than about 1,000,000 Daltons up to 10,000,000 Daltons or more. It will be appreciated by those skilled in the art that molecular weights of starches are difficult to determine. Selection of a starch based on molecular weight is not critical to the practice of the invention.

Particularly preferred starches for use in the practice of the invention are carboxymethylated and hydroxypropylated starches, most preferably carboxymethylated or hydroxypropylated starches having a mean degree of substitution of less than 1.0, more preferably a mean degree of substitution of less than 0.5. "Degree of substitution" refers to the number of substituted ring sites. A starch which has been partially carboxymethylated and partially hydroxypropylated can also be used. Preferably, the partially carboxymethylated and partially hydroxypropylated starch will have a combined mean degree of substitution of less than 1.0 (DS<1.0), more preferably a mean degree of substitution of less than 0.5. In a particularly preferred embodiment, the adhesive comprises a carboxymethylated or hydroxypropylated potato starch having an amylose content of less than 25%.

The starch component will typically be present in amounts of from about 4.0 to about 40.0%, more typically from about 15.0 to about 35.0%, based on the total weight of the adhesive composition.

The adhesives of the invention will also comprise at least one protein. Non-limiting examples of protein systems are soya, gluten, pea, lupin proteins or any other vegetable, legume, seed, animal or micro-organism protein system other than casein or gelatin. Preferred proteins include pea protein, soy bean protein, wheat gluten or lupin protein, more preferable pea or soy bean protein. Modified protein, e.g., chemical, physical or enzymatic modification, may also be used in the practice of the invention. A combination of more than one such protein systems can be used in the formulation.

The protein component will typically be present in amounts of from about 0.1 to about 30.0%, more typically from about 1.0 to about 9.9%, based on the total weight of the adhesive composition.

Other components such as non-starch polysaccharides, inorganic fillers, crosslinking or chelating agents, humectants, plasticizing and fluidizing agents and other conventional additives such as preservatives, antifoaming, pH adjustment, buffering, fragrance and masking agents may be used in the formulations of the invention. Such components may be used to modify the rheological and/or flow and/or tack and/or condensation water resistance and/or substrate wetting and penetration and/or stability and/or odour properties of the starch-protein formulations of the invention.

Non-starch polysaccharides include polysaccharides that are derived from plants (e.g., native or modified celluloses and pectins), seaweeds (e.g., native or modified agarose, carrageenans and alginates), plant exudates (e.g., native or modified gum acacia, gum ghatti, gum tragacanth), seeds (e.g., native or modified guar gum), micro-organisms (e.g., native or modified xanthan and levan) and crustaceans (e.g., native or modified chitin and chitosan). A combination of more than one such non-starch polysaccharides can also be used in the starch-protein formulations of the invention.

Examples of inorganic fillers include china clay, kaolin and calcium carbonate.

Examples of crosslinking agents include ammonium zirconium carbonate, potassium zirconium carbonate, aluminium sulphate, borax and combinations thereof. When a crosslinker is used in the practice of the invention, it will typically be present in amounts of from about 0.01% to about 5.00%, more typically from about 0.10% to about 3.50% by weight, based on the total weight of the adhesive composition.

Examples of humectants, plasticizing and fluidizing agents include, without limitation, urea, dicyandiamide, glycerol, diethylene glycol, triethylene glycol or any other appropriate fluidizing agent, as well as combinations of such agents.

Small amounts of preservatives, antifoaming, pH adjustment, buffering, fragrance and masking agents, as are commonly used in conventional prior art water based labeling adhesives may also be added to the adhesive formulations of the invention.

One particularly preferred adhesive of the invention will comprise, in addition to the starch and protein components, a crosslinker and urea and/or dicyandiamide. When used, dicyandiamide will typically be present in amounts of from about 0.2% to about 2.5% and urea will be present in amounts of from about 5.0% to about 25.0%.

The invention provides a process for bonding a substrate to a similar or dissimilar substrate using the adhesive. The process comprises applying to at least a portion of at least a first substrate an adhesive, bringing a second substrate in contact with the adhesive present on the first substrate, and allowing the adhesive to dry, whereby the first substrate is bonded to the second substrate. The invention further provides articles of manufacture comprising the adhesive.

The adhesive is applied to a substrate while in its wet state (by coating, spraying, etc.) and dried to harden the adhesive layer. The adhesive product can be applied to a substrate such as a cellulosic or plastic label by a variety of methods including coating or spraying in an amount sufficient to cause the article to adhere to a container.

As used herein, a "container" means a jar, bottle, can or canister, bucket, beaker and the like. Specific examples include, but are not limited to soft drink bottles, beer bottles, wine bottles, salad dressing bottles, sauce jars, condiment jars, and the like. The container may be made of any type of material including but not limited to wood, glass, metal, plastic or poly and plastic-coated glass, but is preferably glass.

As used herein, a "label" means e.g., a material having a surface to which an adhesive is applied. The label may be made of any type of material, including but not limited to paper, plastic or metallized paper, cellulose film and the like. Labels may be of any size or shape. While the label may be opaque, use of plastic labels wherein at least a portion is transparent is contemplated. By "transparent" means that at least a portion of the label is substantially clear, i.e., the surface of the substrate to which the label has been applied is visible through the label and adhesive.

Use of the adhesives of the invention to bond labels to e.g., glass substrates is particularly advantageous.

To attach the labels to the article, the adhesive is applied to the surface of the container or, when using a high speed labeler, directly to the label. The label and the article are then contacted under pressure and the adhesive bond allowed to set. The amount of pressure and the time need to set the bond will depend upon the type of container, label, and the particular adhesive formulation used.

Recycling of labeled bottles typically involves washing the bottle, usually in an alkaline water solution (i.e., water with a base added to raise the pH above 7, typically at least about 12 or more). The water may or may not be heated and the agitation levels vary.

While the adhesive finds particular use as a labeling adhesive, other uses are clearly contemplated and are encompassed by the invention. The adhesive described herein may be used for, e.g., laminating.

The following examples are for purpose of illustration and not intended to limit the scope of the invention in any manner.

EXAMPLES

The following materials and test methods were used in the examples:

Materials:

Emcol DA1344 is a hydroxypropylated potato starch with an amylose content of approximately 22% which is commercially available from Emsland Stärke GmbH.

Solvitose HNP is a pregelatinized, oxidized hydroxypropylether of potato starch with an amylose content of approximately 22% which is commercially available from AVEBE B.A.

Textra is a tapioca starch with an amylose content of approximately 17% which is commercially available from National Starch and Chemical.

Emsize CMS60 is a carboxymethylated potato starch with an amylose content of approximately 22% which is commercially available from Emsland Stärke GmbH.

Purity SCSA is a waxy maize starch commercially available from National Starch and Chemical.

Dexylose I231 is a cold water soluble waxy maize starch commercially available from Roquette Freres.

Collys B.R. is a crosslinked pregelatinised wheat starch with an amylose content of approximately 26% which is commercially available from Roquefte Freres.

Hyfoama 77 is a hydrolysed wheat gluten protein commercially available from Quest International Nederland B.V.

Hyfoama PW Dev is a hydrolysed pea protein commercially available from Quest International Nederland B.V.

Pisane HD is a pea protein isolate, extracted from yellow peas and commercially available from Cosucra SA.

Pro-Cote RXP810 is a low molecular weight chemically modified soy protein isolate commercially available from DuPont Soy Polymers.

Walocel CRT100GA is a sodium-carboxymethyl-cellulose commercially available from Wolff Cellulosics GmbH & Co. KG.

Tylose H20 is a hydroxyethyl-cellulose commercially available from Clariant GmbH.

Aluminium Sulphate is a crosslinking agent.

Borax is a crosslinking and buffering agent.

AZC solution 17% w/w is a solution of the crosslinking agent Ammonium Zirconium Carbonate.

China Clay is an inorganic filler.

Agitan 301 and Bevaloid 6575 are antifoaming agents commercially available from Münzing Chemie GmbH and Rhodia (UK) Ltd respectively.

Rocima 607 is a biocide commercially available from Rohm & Haas (UK) Ltd.

Acticide IPS15 is a fungicide commercially available from THOR GmbH.

Citrus Terpene oil is a fragrance.

The hydrochloric acid solution is added to adjust the pH of the formulation.

Ammonium Acetate is a pH stabilising buffer system.

Urea is a fluidizing agent.

Diethylene Glycol is a plasticizing agent

Test Methods:

Viscosity (mPa·s): The viscosity was measured in mPa·s, at 23° C. and by using a Brookfield spindle No. 29 and a rotation speed of 5 rpm on a Brookflied viscometer.

Storage stability trials: Adhesive samples were stored in sealed 500 g containers and under ambient conditions in a laboratory for a minimum period of 6 months. Following this storage period the containers were opened and the flow, aspect, colour and odour of the samples was inspected. Finally, the viscosity of the samples was measured as described by the previous method above.

Tack (mm/kp): The tack was measured in mm/kp (where 1 kp=9.80665N), at 23° C. and by using a Fipago Tack tester supplied by STRÖHLEIN Instruments. For each measurement, the label (having dimensions of 15 cm×2.5 cm and being made from a material relevant to the application, e.g., label quality paper, cellulose film, plastic film, etc.), was coated on one side with adhesive using a coating block with a gap of 60 □m. The label was immediately transferred so that its coated side covered on one end an immobile substrate and on the other end a mobile substrate plate (made from a material relevant to the application, e.g., glass, plastic, wood etc), which was fixed on the mobile pendulum shaft of the apparatus. After the elapse of 3 seconds (open time), a roller automatically passed over the label and pressed it uniformly against the mobile substrate. One end of the label was then pressed firmly against the immobile substrate and after the elapse of a further 2 seconds (closed time) the pendulum shaft was automatically released and dropped under its own weight, thus peeling the label from the mobile substrate. The peeling force was measured by the instrument and displayed on a scale from 0 (=no peel resistance) to 100 (=label failed to peel off the mobile substrate).

Wet-out (%): The wet-out properties of the adhesive were measured in conjunction with the Fipago tack test method described above. After the completion of the tack test, the presence of adhesive on the surface of the mobile substrate was visually inspected. A perfect wet-out will result in an adhesive trace that will be visible over the full area of previous contact between the label and the mobile substrate (i.e., a 2.5 cm—wide rectangular trace all the way along the surface of the mobile substrate). In contrast, an adhesive with limited wet-out properties will only partially trace the surface of the mobile substrate. The % wet-out was therefore visually estimated as the % of initial contact surface area, between the label and the mobile substrate, that was marked with an adhesive trace following each Fipago tack test.

Condensation Water Resistance—CWR—(% fibre tear): The CWR test applies to labels that are made from cellulosic materials and was executed as follows: Containers made from a relevant material to the application (e.g., glass/plastic bottles, jars etc) were filled with water and stored at 4° C. for 24 hours. Labels were then coated with a wire-wound bar (K-bar) to a coat weight relevant to the application (in the examples of the present invention a coat-weight of 8.0-12.0 g/m$^2$ was used) and the coated labels were immediately applied onto the surface of the cold and wet (due to condensation) surface of the container. The container was then stored for 1 or 2 hours in a humidity cabinet which was pre-set to 25° C. and 95% RH. During the above storage period water of 5° C. was circulated through the container via a waterbath which was connected with tubes to the container. The labeled container was therefore constantly exposed to condensation water that formed on its surface. The container was then removed from the humidity cabinet and left to dry for 24 h at 23° C. and 50% RH. The label was then peeled off by hand and the CWR was visually estimated as the % of the initial label surface area that provided some level of fibre tear. Areas of the label where the adhesive had been washed away from condensation water did not provide any fibre tear.

Caustic wash (sec): During this test, labels were coated with a wire-wound bar (K-bar) to a coat weight relevant to the application (in the examples of the present invention a coat-weight of 8.0-12.0 g/m$^2$ was used) and then immediately applied onto the surface of the container (e.g., glass bottle). The labeled container was then left to cure for 1 week at 23° C. and 50% RH. The caustic wash properties of the adhesive were tested by fully immersing the labeled area of the container in a 75° C., 1% NaOH solution. The caustic solution was constantly stirred by means of a magnetic stirrer which was placed underneath the immersed container. The result of the caustic wash test was the time needed (in sec) for the label to be completely removed from the bottle.

Hot water wash (sec): The hot water wash test was conducted in exactly the same way as described above for the caustic wash test, but by using hot water of 55° C. instead of a caustic solution. The result of the hot water wash test was the time needed (in sec) for the label to be completely removed from the bottle.

Optimum machining coat weight (g/m$^2$): In order to identify the optimum machining coat weight, a pail of adhesive was run on an industrial scale labelling machine (manufactured by Krones AG) and the coat weight of the adhesive was adjusted to the minimum amount that would provide good adhesion (no "flagging" of label corners) and fast drying properties of the adhesive. The average coat weight of the adhesive was then measured by comparing the weight of 10 coated labels against that of 10 unused labels. The above measurement was repeated at different speeds of the labelling machine, e.g., at 40000 bph and 60000 bph (where bph is bottles per hour).

COD (Chemical Oxygen Demand in g/kg sample): This is the amount of oxygen required for the chemical oxidation of the adhesive in water, as determined using dichromate as the oxidant.

BOD$_5$ (Biochemical Oxygen Demand in g/kg sample): This is the amount of oxygen required for biodegradation of the adhesive by micro-organisms growing under aerobic (oxygenated) conditions. The test was performed on an appropriately diluted sample (below any toxic effect concentration), at 20° C. and for a period of 5 days (hence BOD$_5$), after a very small inoculum of micro-organisms was added at the start of the test.

Example 1

Adhesive samples 1-10 were prepared by the following process:

The water and the antifoaming agent were added into a mixing vessel.

Under medium agitation (e.g., 40 rpm), all starch components (native or modified) were slowly added into the mix.

If a non-starch polysaccharide component (native or modified) was used, it was then slowly added to the mix.

All protein components (native or modified) were then also slowly added into the mix.

If used, all cross-linking agents were added into the mix after having heated it to 30° C.

The mix was then heated to 82° C. and maintained at this temperature for 30 min.

If necessary, the pH of the mix was then adjusted to 7.5-8.5 by using the appropriate pH adjustment or buffering agents.

If used, any humectants, fluidizing and plasticizing agents were then added into the mix.

The mix was then cooled to below 50° C. and, if used, all inorganic fillers, biocides, fungicides, fragrances and masking agents were added to the mix.

The formulation was then finally mixed for 20 minutes and allowed to cool to below 45° C.

Example 2

Adhesive sample 1 was prepared having the composition shown in Table 1. Performance characteristics are also shown in Table 1.

TABLE 1

| Sample 1 | (% w/w) |
| --- | --- |
| Water | 53.00 |
| Emcol DA1344 | 25.00 |
| Urea | 20.00 |
| Hyfoama 77 | 2.00 |
| Total | 100.00 |
| Viscosity (mPa · s @ 23° C.) | 54400 |
| Viscosity after storage for 16 months (mPa · s @ 23° C.) | 62000 |
| Tack (mm/kp) | 29 |
| Wet-out (%) | 97 |

The formulation of sample 1 is based on a combination of a hydroxypropylated potato starch with a hydrolysed wheat gluten isolate. Sample 1 had a combination of excellent flow, high tack and almost perfect wet-out properties that were comparable to those of commercially available casein based labelling adhesives. The sample remained in good condition and at workable viscosity levels during a storage stability trial of 16 months.

Example 3

Adhesive sample 2 was prepared having the composition shown in Table 2. Performance characteristics are also shown in Table 2.

TABLE 2

| Sample 2 | (% w/w) |
| --- | --- |
| Water | 53.00 |
| Emcol DA1344 | 25.00 |
| Urea | 20.00 |
| Hyfoama PW Dev | 2.00 |
| Total | 100.00 |
| Viscosity (mPa · s @ 23° C.) | 64600 |
| Viscosity after storage for 16 months (mPa · s @ 23° C.) | 89000 |
| Tack (mm/kp) | 31 |
| Wet-out (%) | 94 |

The formulation of sample 2 is based on a combination of a hydroxypropylated potato starch with a hydrolysed pea protein isolate. Sample 2 had a combination of excellent flow, high tack and very good wet-out properties that were comparable to those of commercially available casein based labeling adhesives. The sample remained in good condition and at workable viscosity levels during a storage stability trial of 16 months.

Example 4

Adhesive sample 3 was prepared having the composition shown in Table 3. Performance characteristics are also shown in Table 3.

TABLE 3

| Sample 3 | (% w/w) |
| --- | --- |
| Water | 52.71 |
| Solvitose HNP | 20.03 |
| Purity SCSA | 5.06 |
| Textra | 5.06 |
| Urea | 11.60 |
| Pro-Cote RXP810 | 5.06 |
| Bevaloid 6575 | 0.12 |
| Agitan 301 | 0.08 |
| Rocima 607 | 0.15 |
| Acticide IPS15 | 0.11 |
| Citrus terpene oil | 0.02 |
| Total | 100.00 |
| Viscosity (mPa · s @ 23° C.) | 81600 |
| Tack (mm/kp) | 33 |
| Wet-out (%) | 75 |
| CWR (% fibre tear) | 1 h: 95 |
|  | 2 h: 63 |

The formulation of sample 3 is based on a combination of a pregelatinised and oxidised hydroxypropylated potato starch, a waxy maize starch and a tapioca starch, together with a low molecular weight chemically modified soy protein isolate. Sample 3 had a combination of excellent flow, high tack, sufficient wet-out and excellent 1 and 2 h Condensation Water Resistance properties that were comparable to those of commercially available casein based labeling adhesives.

Example 5

Adhesive sample 4 was prepared having the composition shown in Table 4. Performance characteristics are also shown in Table 4.

TABLE 4

| Sample 4 | (% w/w) |
| --- | --- |
| Water | 56.65 |
| Emcol DA1344 | 12.50 |
| Emsize CMS60 | 12.50 |

TABLE 4-continued

| Sample 4 | (% w/w) |
|---|---|
| Urea | 15.00 |
| Pisane HD | 2.00 |
| Agitan 301 | 0.20 |
| Rocima 607 | 0.15 |
| China Clay | 1.00 |
| Total | 100.00 |
| Viscosity (mPa · s @ 23° C.) | 61000 |
| Viscosity after 14 months storage (mPa · s @ 23° C.) | 94000 |
| Tack (mm/kp) | 24 |
| Wet-out (%) | 85 |

The formulation of sample 4 is based on a combination of a hydroxypropylated potato starch with a carboxymethylated potato starch, a pea protein isolate and china clay as an inorganic filler. Sample 4 had a combination of excellent flow, as well as good tack and wet-out properties that were comparable to those of commercially available casein based labeling adhesives. The sample remained in good condition and at workable viscosity levels during a storage stability trial of 14 months.

Example 6

Adhesive sample 5 was prepared having the composition shown in Table 5. Performance characteristics are also shown in Table 5.

TABLE 5

| Sample 5 | (% w/w) |
|---|---|
| Water | 58.70 |
| Solvitose HNP | 17.78 |
| Purity SCSA | 5.08 |
| Textra | 5.08 |
| Urea | 9.14 |
| Pro-Cote RXP810 | 2.54 |
| Walocel CRT100GA | 1.19 |
| Bevaloid 6575 | 0.14 |
| Agitan 301 | 0.08 |
| Rocima 607 | 0.15 |
| Acticide IPS15 | 0.10 |
| Citrus terpene oil | 0.02 |
| Total | 100.00 |
| Viscosity (mPa · s @ 23° C., 5 rpm) | 87600 |
| Tack (mm/kp) | 26 |
| Wet-out (%) | 95 |
| CWR (% fibre tear) | 1 h: 86 |
|  | 2 h: 83 |

The formulation of sample 5 is based on a combination of a pregelatinised and oxidised hydroxypropylated potato starch, a waxy maize starch and a tapioca starch, together with a low molecular weight chemically modified soy protein isolate and a sodium-carboxymethyl-cellulose as a non-starch polysaccharide. Sample 5 had a combination of excellent flow, good tack, almost perfect wet-out and very good 1 and 2 h Condensation Water Resistance properties that were comparable to those of commercially available casein based labeling adhesives.

Example 7

Adhesive sample 6 was prepared having the composition shown in Table 6. Performance characteristics are also shown in Table 6.

TABLE 6

| Sample 6 | (% w/w) |
|---|---|
| Water | 59.36 |
| Solvitose HNP | 15.40 |
| Purity SCSA | 5.13 |
| Textra | 5.13 |
| Urea | 9.24 |
| Pro-Cote RXP810 | 2.57 |
| Tylose H20 | 2.57 |
| Borax | 0.12 |
| Bevaloid 6575 | 0.13 |
| Agitan 301 | 0.08 |
| Rocima 607 | 0.15 |
| Acticide IPS15 | 0.11 |
| Citrus terpene oil | 0.01 |
| Total | 100.00 |
| Viscosity (mPa · s @ 23° C.) | 67600 |
| Tack (mm/kp) | 22 |
| Wet-out (%) | 90 |
| CWR (% fibre tear) | 1 h: 95 |
|  | 2 h: 40 |

The formulation of sample 6 is based on a combination of a pregelatinised and oxidised hydroxypropylated potato starch, a waxy maize starch and a tapioca starch, together with a low molecular weight chemically modified soy protein isolate, a hydroxyethyl-cellulose as a non-starch polysaccharide and borax as a cross-linker. Sample 6 had a combination of excellent flow, good tack, good wet-out, excellent 1 h and good 2 h Condensation Water Resistance properties that were comparable to those of commercially available casein based labeling adhesives.

Example 8

Adhesive sample 7 was prepared having the composition shown in Table 7. Performance characteristics are also shown in Table 7.

TABLE 7

| Sample 7 | (% w/w) |
|---|---|
| Water | 54.27 |
| Solvitose HNP | 11.50 |
| Purity SCSA | 5.00 |
| Textra | 5.00 |
| Dexylose I231 | 8.00 |
| Urea | 12.00 |
| Pro-Cote RXP810 | 2.00 |
| Tylose H20 | 1.50 |
| Aluminium Sulphate | 0.04 |
| Ammonium Acetate | 0.22 |
| Bevaloid 6575 | 0.12 |
| Agitan 301 | 0.08 |
| Rocima 607 | 0.15 |
| Acticide IPS15 | 0.10 |
| Citrus terpene oil | 0.02 |
| Total | 100.00 |
| Viscosity (mPa · s @ 23° C.) | 77000 |
| Tack (mm/kp) | 29 |
| Wet-out (%) | 100 |
| CWR (% fibre tear) | 1 h: 80 |
|  | 2 h: 45 |

TABLE 7-continued

| Sample 7 | (% w/w) |
|---|---|
| Hot water wash (sec) | 90 |
| Optimum machining coat weight (g/m$^2$) | 40000 bph: 8.0 |
|  | 60000 bph: 8.1 |

The formulation of sample 7 is based on a combination of a pregelatinised and oxidised hydroxypropylated potato starch, two types of waxy maize starch and a tapioca starch, together with a low molecular weight chemically modified soy protein isolate, a hydroxyethyl-cellulose as a non-starch polysaccharide and aluminium sulphate as a cross-linker. Sample 7 had a combination of excellent flow, high tack, excellent wet-out, good 1 h and 2 h Condensation Water Resistance properties that were comparable to those of commercially available casein based labeling adhesives. The optimum coat weight of sample 7 was measured during labeling machine trials to be approximately 8.0 g/m$^2$, which is significantly lower compared to coat weights of 16 g/m$^2$ or higher required by commercially available casein based adhesives.

Example 9

Adhesive sample 8 was prepared having the composition shown in Table 8. Performance characteristics are also shown in Table 8.

TABLE 8

| Sample 8 | (% w/w) |
|---|---|
| Water | 49.00 |
| Emsize CMS60 | 25.00 |
| Purity SCSA | 5.00 |
| Urea | 15.00 |
| Pisane HD | 2.00 |
| Aluminium Sulphate | 0.13 |
| AZC solution 17% (w/w) | 1.00 |
| Agitan 301 | 0.20 |
| Rocima 607 | 0.15 |
| Acticide IPS15 | 0.10 |
| Hydrochloric acid solution 2.5M | 2.42 |
| Total | 100.00 |
| Viscosity (mPa · s @ 23° C.) | 112200 |
| Viscosity after 6 months storage (mPa · s @ 23° C.) | 147600 |
| Tack (mm/kp) | 29 |
| Wet-out (%) | 85 |
| CWR (% fibre tear) | 1 h: 95 |
|  | 2 h: 95 |
| Caustic wash (sec) | 63 |
| Hot water wash (sec) | 169 |
| Optimum machining coat weight (g/m$^2$) | 40000 bph: 11.3 |
|  | 60000 bph: 9.2 |
| BOD$_5$ (g/kg sample) | 135 |
| COD (g/kg sample) | 310 |

The formulation of sample 8 is based on a combination of a carboxymethylated potato starch, a waxy maize starch, a pea protein isolate, together with a combination of aluminium sulphate and ammonium zirconium carbonate as a cross-linking system. Sample 8 had a combination of excellent flow, high tack, good wet-out, excellent 1 h and 2 h Condensation Water Resistance properties and very fast caustic wash properties that were comparable to those of commercially available casein based labeling adhesives. Furthermore, labels adhered on glass bottles using the adhesive of sample 8 were also removable in hot water within less than 3 min. This would allow users of this formulation to replace their caustic wash process with a hot water process. Sample 8 remained in good condition and at workable viscosity levels during a storage stability trial of 6 months. The optimum coat weight of example 8 was measured during labeling machine trials to be between approximately 9.2-11.3 g/m$^2$, which is significantly lower, compared to coat weights of 16 g/m$^2$ or higher required by commercially available casein based adhesives. Finally, the COD and BOD$_5$ values of adhesive sample 8 were measured at 310 g/kg and 135 g/kg sample respectively, giving a COD/BOD$_5$ ratio of approximately 2.3. This ratio is lower compared to most commercially available synthetic polymer based labeling adhesives which have a COD/BOD$_5$ ratio close to 10 or higher.

Example 10

Adhesive sample 9 was prepared having the composition shown in Table 9. Performance characteristics are also shown in Table 9.

TABLE 9

| Sample 9 | (% w/w) |
|---|---|
| Water | 50.30 |
| Emsize CMS60 | 25.00 |
| Purity SCSA | 5.00 |
| Urea | 15.00 |
| Pisane HD | 2.00 |
| Aluminium Sulphate | 0.13 |
| Agitan 301 | 0.20 |
| Rocima 607 | 0.15 |
| Hydrochloric acid solution 2.5M | 1.72 |
| Diethylene Glycol | 0.50 |
| Total | 100.00 |
| Viscosity (mPa · s @ 23° C.) | 112000 |
| Viscosity after 10 months storage (mPa · s @ 23° C.) | 98200 |
| Tack (mm/kp) | 31 |
| Wet-out (%) | 86 |
| CWR (% fibre tear) | 1 h: 80 |
|  | 2 h: 20 |
| Hot water wash (sec) | 160 |
| Optimum machining coat weight (g/m$^2$) | 40000 bph: 10.6 |
|  | 50000 bph: 9.0 |
|  | 60000 bph: 11.1 |

The formulation of sample 9 is based on a combination of a carboxymethylated potato starch, a waxy maize starch, a pea protein isolate, aluminium sulphate as a cross-linking system, together with a combination of urea and diethylene glycol as the humectant and plasticizing system. Sample 9 had a combination of excellent flow, high tack, good wet-out, good 1 h and acceptable 2 h Condensation Water Resistance properties. The sample remained in good condition and at workable viscosity levels during a storage stability trial of 10 months. Furthermore, labels adhered on glass bottles using the adhesive of sample 9 were removable in hot water within less than 3 min. This would allow users of this formulation to replace their caustic wash process with a hot water process. The optimum coat weight of sample 9 was measured during labeling machine trials to be between approximately 9.0-11.1 g/m$^2$, which is significantly lower, compared to coat weights of 16 g/m$^2$ or higher required by commercially available casein based adhesives.

Example 11

Adhesive sample 10 was prepared having the composition shown in Table 10. Performance characteristics are also shown in Table 10.

TABLE 10

| Sample 10 | (% w/w) |
|---|---|
| Water | 52.25 |
| Dexylose I231 | 26.10 |
| Collys B.R. | 5.70 |
| Urea | 11.80 |
| Pisane HD | 3.00 |
| Ammonium Acetate | 0.70 |
| Bevaloid 6575 | 0.20 |
| Rocima 607 | 0.15 |
| Acticide IPS15 | 0.10 |
| Total | 100.00 |
| Viscosity (mPa · s @ 23° C.) | 114000 |
| Viscosity after 12 months storage (mPa · s @ 23° C.) | 154600 |
| Tack (mm/kp) | 26 |
| Wet-out (%) | 66 |
| Optimum machining coat weight (g/m$^2$) | 40000 bph: 9.7<br>60000 bph: 12.0 |

The formulation of sample 10 is based on a combination of a cold water soluble waxy maize starch and a crosslinked pregelatinised wheat starch, together with a pea protein isolate. Sample 10 had a combination of excellent flow, good tack and sufficient wet-out properties that were comparable to those of commercially available casein based labeling adhesives. The sample remained in good condition and at workable viscosity levels during a storage stability trial of 12 months. The optimum coat weight of sample 10 was measured during labeling machine trials to be approximately between 9.7-12.0 g/m$^2$, which is significantly lower, compared to coat weights of 16 g/m$^2$ or higher required by commercially available casein based adhesives.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

The invention claimed is:

1. A water based adhesive, suitable for industrial bottle labeling applications, comprising one or more starches and a protein component,
   wherein said one or more starches do not contain leguminous starch having an amylose content of 25% or more;
   wherein said protein component comprises pea protein, soy protein, wheat gluten or lupin protein; and said protein component does not contain casein or gelatin; and
   wherein said adhesive is free of synthetic polymer.

2. The adhesive of claim 1 wherein said starch comprises a carboxymethylated or hydroxypropylated starch having a mean degree of substitution of less than about 1.0.

3. The adhesive of claim 2 where the starch component comprises a carboxymethylated potato starch.

4. The adhesive of claim 1 further comprising a crosslinking agent.

5. The adhesive of claim 1 further comprising a plasticizing or fluidizing agent, a non-starch polysaccharide or an inorganic filler.

6. The adhesive of claim 5 comprising urea and/or dicyandiamide.

7. The adhesive of claim 1 wherein said protein component comprises a chemically or physically modified or hydrolyzed protein.

8. The adhesive of claim 1 which has a COD/BOD$_5$ ratio of less than 5.

9. A process for bonding a label to a container comprising applying to at least one substrate surface of a label and/or a container the adhesive of claim 1, and bringing the substrate surface of said label in contact with the substrate surface of said container.

10. A labeled article comprising the adhesive of claim 1.

11. The adhesive of claim 4 which has a COD/BOD$_5$ ratio of less than 5.

* * * * *